United States Patent
Choi et al.

(10) Patent No.: US 10,660,133 B2
(45) Date of Patent: May 19, 2020

(54) METHOD AND SYSTEM FOR RANDOM ACCESS AND UPLINK DATA TRANSMISSION FOR LOW LATENCY COMMUNICATION

(71) Applicant: Seoul National University R&DB Foundation, Seoul (KR)

(72) Inventors: Sunghyun Choi, Seoul (KR); Sundo Kim, Gunpo-si (KR); Junseok Kim, Yongin-si (KR); Kitaek Lee, Anyang-si (KR); Seungil Park, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 247 days.

(21) Appl. No.: 15/368,933

(22) Filed: Dec. 5, 2016

(65) Prior Publication Data

US 2017/0164411 A1 Jun. 8, 2017

(30) Foreign Application Priority Data

Dec. 3, 2015 (KR) .................. 10-2015-0171755
Jan. 29, 2016 (KR) .................. 10-2016-0011438
Apr. 21, 2016 (KR) .................. 10-2016-0048572

(51) Int. Cl.
*H04W 72/04* (2009.01)
*H04W 74/08* (2009.01)
*H04W 28/02* (2009.01)

(52) U.S. Cl.
CPC ... *H04W 74/0833* (2013.01); *H04W 28/0278* (2013.01); *H04W 72/0413* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 7,839,829 B2 | 11/2010 | Lee et al. |
| 7,843,877 B2 | 11/2010 | Lee et al. |
| 7,848,308 B2 | 12/2010 | Lee et al. |
| 8,175,052 B2 | 5/2012 | Lee et al. |
| 8,223,713 B2 | 7/2012 | Lee et al. |
| 8,451,821 B2 | 4/2013 | Lee et al. |

(Continued)

FOREIGN PATENT DOCUMENTS

| | | |
|---|---|---|
| KR | 10-2008-0018147 A | 2/2008 |
| KR | 10-2008-0100189 A | 11/2008 |

(Continued)

OTHER PUBLICATIONS

Seok, Roh Dong, et al. "Non-Orthogonal Multiple Access Method with Dedicated Bandwidth for Low Latency Communication." 2016 Annual Conference of the Korean Institute of Communication Sciencea. Korean Advanced Insititute for Science and Technology (KAIST). 2016: pp. 880-881. (7 pages with English translation).

(Continued)

*Primary Examiner* — Willie J Daniel, Jr.
(74) *Attorney, Agent, or Firm* — NSIP Law

(57) ABSTRACT

A random access method may include receiving a random access preamble that is uniquely allocated to a User Equipment (UE) from the UE on an extended-Physical Random Access Channel (e-PRACH) and identifying the UE based on the random access preamble.

7 Claims, 14 Drawing Sheets

(56) References Cited

U.S. PATENT DOCUMENTS

| | | | |
|---|---|---|---|
| 8,406,190 B2 | | 5/2013 | Lee et al. |
| 8,437,335 B2 | | 5/2013 | Lee et al. |
| 8,526,374 B2 | | 9/2013 | Damnjanovic et al. |
| 8,587,179 B2 | | 10/2013 | Yaoi et al. |
| 9,113,477 B2 | * | 8/2015 | Pelletier ................ H04L 1/1877 |
| 9,462,576 B2 | | 10/2016 | Lee et al. |
| 9,661,654 B2 | * | 5/2017 | Jeong .................. H04W 74/006 |
| 9,706,580 B2 | | 7/2017 | Lee et al. |
| 10,165,550 B2 | * | 12/2018 | Webb .................... H04W 72/04 |
| 2010/0238872 A1 | | 9/2010 | Kim et al. |
| 2014/0233528 A1 | | 8/2014 | Webb et al. |
| 2015/0359005 A1 | | 12/2015 | Wong et al. |

FOREIGN PATENT DOCUMENTS

| KR | 10-2011-0053386 A | 5/2011 |
|---|---|---|
| KR | 10-2013-0088121 A | 4/2013 |
| WO | WO 2013/044970 A1 | 4/2013 |

OTHER PUBLICATIONS

Korean Notice of Allowance dated Jul. 20, 2019 in counterpart Korean Application No. 10-2016-0011438 (2 pages in Korean).
Korean Notice of Allowance dated Jul. 28, 2017 in counterpart Korean Application No. 10-2016-0048572 (1 page in Korean).
Korean Office Action dated Mar. 21, 2017 in corresponding Korean Application No. 10-2016-0048572 (5 pages in Korean).
Korean Office Action dated Feb. 24, 2017 in corresponding Korean Application No. 10-2016-0011438 (6 pages in Korean).

\* cited by examiner

BIT INDICATING INFORMATION

FIG. 7

| 3-BITS OF INFORMATION | AMOUNT OF DATA TO BE TRANSMITTED [bytes] |
|---|---|
| 0 | $\chi \leq 26$ |
| 1 | $26 < \chi \leq 91$ |
| 2 | $91 < \chi \leq 321$ |
| 3 | $321 < \chi \leq 1132$ |
| 4 | $1132 < \chi \leq 3995$ |
| 5 | $3995 < \chi \leq 14099$ |
| 6 | $14099 < \chi \leq 150000$ |
| 7 | $\chi > 150000$ |

METHOD AND SYSTEM FOR RANDOM ACCESS AND UPLINK DATA TRANSMISSION FOR LOW LATENCY COMMUNICATION

CROSS-REFERENCE TO RELATED APPLICATION(S)

This application claim priority from Korean Patent Application Nos. 10-2015-0171755, filed on Dec. 3, 2015, 10-2016-0011438, filed on Jan. 29, 2016, and 10-2016-0048572, filed on Apr. 21, 2016, in the Korean Intellectual Property Office, the disclosure of which is incorporated herein by reference in its entirety.

BACKGROUND

1. Field

The following description relates to a mobile communication system, and more particularly, to a method and system for random access and uplink data transmission for low latency communication.

2. Description of Related Art

Long term evolution (LTE) systems employ a method of transmitting or receiving data through scheduling-based resource allocation by base station (or evolved Node B in LTE) in order to maximize resource utilization. That is, when a User Equipment (UE) has data to transmit, the UE preferentially requests uplink resources to base station, and then transmits the data using the uplink resources allocated by the base station.

This causes latency in uplink data transmission of the UE.

In particular, when uplink data to be transmitted by a UE requires low latency, such latency may cause deterioration of service quality.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

The following description relates to a method and system for random access and uplink data transmission for low latency communication.

In one general aspect, a random access method includes receiving a random access preamble that is uniquely allocated to a User Equipment (UE) on an extended-Physical Random Access Channel (e-PRACH) and identifying the UE based on the random access preamble.

The e-PRACH may be allocated onto frequency resources corresponding to x resource blocks (RBs) (here, x is a natural number) and time resources corresponding to y transmission time intervals (TTIs) (here, y is a natural number) in a subframe.

The random access method may further include acquiring additional information regarding random access from the random access preamble.

The additional information regarding random access may include at least one of random access purpose information and buffer status information of the UE.

The random access method may further include allocating uplink transmission resources for transmission of uplink data to the UE based on the buffer status information.

In another general aspect, an uplink data transmission method of a UE includes transmitting an allocated random access preamble to a base station and repeatedly transmitting the uplink data to the base station by using a set of resources corresponding to the allocated random access preamble.

The allocated random access preamble may be distinct from those of other UEs, and may be used to identify the UE.

The uplink data transmission may include repeatedly transmitting the uplink data immediately after transmitting the allocated random access preamble to the base station.

The uplink data transmission method may further include receiving the allocated random access preamble from the base station.

The uplink data transmission method may further include receiving random access preamble transmission time information from the base station.

The receiving of random access preamble transmission time information may include receiving the random access preamble transmission time information together with system information.

The uplink data transmission method may further include receiving resources for retransmission allocated by the base station when the transmission of the uplink data fails and retransmitting the uplink data to the base station by using the newly allocated resources.

The resources for retransmission may be uplink data transmission channel resources.

In another general aspect, a UE includes a communication unit configured to transmit data to a base station and receive data from the base station and a controller configured to control the communication unit to transmit an allocated random access preamble to the base station and use a set of resources corresponding to the allocated random access preamble to repeatedly transmit the uplink data to the base station.

The controller may repeatedly transmit the uplink data immediately after transmitting the allocated random access preamble to the base station.

The communication unit may receive random access preamble transmission time information from the base station.

The communication unit may receive the random access preamble transmission time information together with system information.

The communication unit may receive resource allocation information for retransmission allocated by the base station when the uplink data transmission fails, and the controller may control the communication unit to use the allocated resources to retransmit the uplink data to the base station.

The resources for retransmission may be uplink data transmission channel resources.

Other features and aspects will be apparent from the following detailed description, the drawings, and the claims.

BRIEF DESCRIPTION OF THE DRAWINGS

FIG. 7 is an example diagram showing a buffer status information transfer method based on a random access preamble carried on an e-PRACH.

Figure 1:
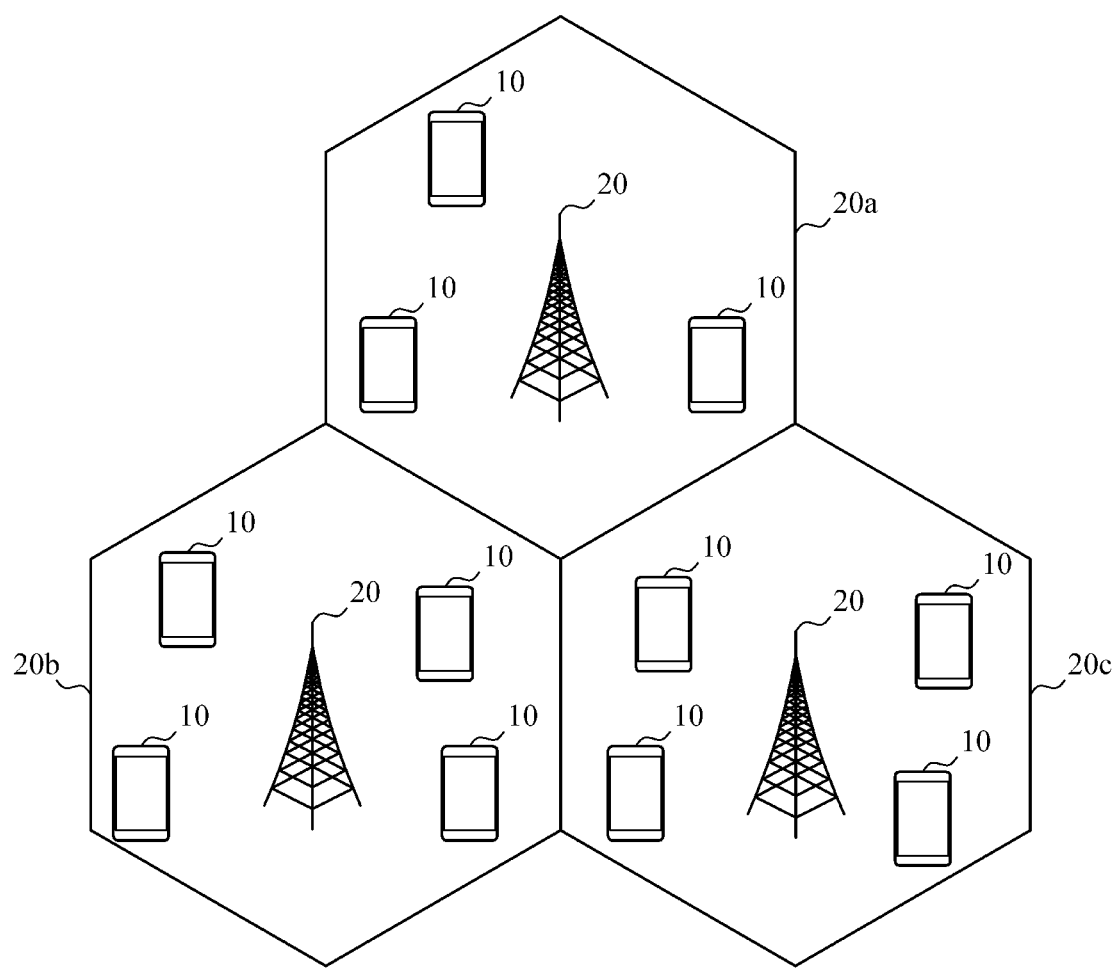
FIG. 1 is a block diagram showing an embodiment of a mobile communication system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, embodiments of the present invention will be described in detail with reference to the accompanying drawings. In the following description, when a detailed description of a relevant known function or configuration is determined to unnecessarily obscure the gist of the present invention, the detailed description will be omitted. Also, terms used herein are defined in consideration of the functions of the present invention and may be changed depending on a user, the intent of an operator, or a custom. Accordingly, the terms must be defined based on the following overall description of this specification.

The following technique may be used in a variety of mobile communication systems, for example, Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and the like. CDMA may be embodied through radio technology such as Universal Terrestrial Radio Access (UTRA) or CDMA2000. TDMA may be embodied through radio technology such as Global System for Mobile communications (GSM), General Packet Radio Service (GPRS), and Enhanced Data Rates for GSM Evolution (EDGE). OFDMA may be embodied through radio technology such as Institute of Electrical and Electronics Engineers (IEEE) 802.11 (Wi-Fi), IEEE 802.16 (WiMAX), IEEE 802-20, and Evolved UTRA (E-UTRA). IEEE 802.16m is an evolved version of IEEE 802.16e and provides backward compatibility to a system based on IEEE802.16e. 3rd Generation Partnership Project (3GPP) LTE is a part of Evolved UMTS (E-UMTS) using evolved-UMTS terrestrial radio access (E-UTRA). 3GPP LTE employs OFDMA in downlink and employs SC-FDMA in uplink. LTE-A is an evolved version of 3GPP LTE.

For convenience of description, the following description focuses on LTE, but the present invention is not limited thereto. That is, the present invention may be applied to any communication system and method to which the technical spirit of the invention is applicable.

FIG. 1 is a block diagram showing an embodiment of a mobile communication system.

Referring to FIG. 1, the mobile communication system may include at least one base station (BS) 20. The base station 20 may provide a communication service to a specific geographic area (hereinafter referred to as a cell) 20*a*, 20*b*, or 20*c*. A User Equipment (UE) 10 may be mobile and may be referred to by other terms such as a mobile station (MS), a mobile terminal (MT), a user terminal (UT), a subscriber station (SS), a wireless device, a personal digital assistant (PDA), a wireless modem, a handheld device, a terminal, or the like. Generally, the base station 20 refers to a fixed station that communicates with the UE 10 and may be referred to as an evolved-NodeB (eNodeB), a base transceiver system (BTS), an access point, etc.

The UE 10 may receive a control signal from the base station 20 in downlink and may also transmit information to the base station 20 in uplink.

The information transmitted or received by the UE 10 may include data and a variety of control information, and there may be various physical channels depending of the type and use of information transmitted or received by the UE 10.

When the UE 10 that was powered off is powered on again or when the UE 10 re-enters a cell, the UE 10 may perform an initial cell search process such as synchronization with the base station 20. To this end, the UE 10 may acquire synchronization with the base station 20 and obtain information such as a cell ID by using a synchronization channel of the base station 20. Subsequently, the UE 10 may receive a physical broadcast channel from the base station 20 and acquire cell broadcast information.

Figure 2:
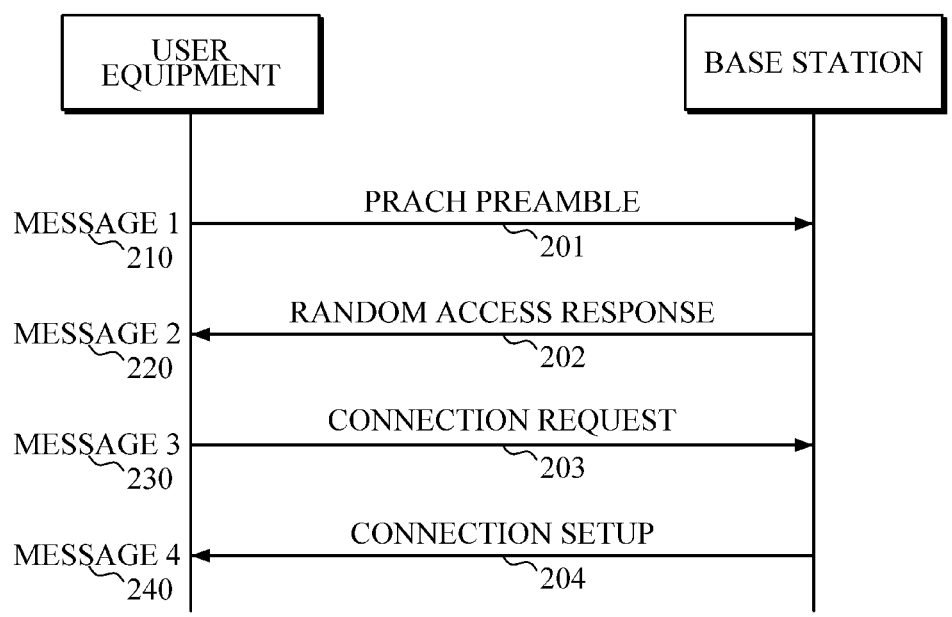
FIG. 2 is a flowchart showing a conventional random access method.

FIG. 2 is a flowchart showing a general random access method.

Referring to FIG. 2, a UE selects one of 64 random access preambles (six-bits of information) and transmits message 1 210 including the selected random access preamble to a base station (201).

The base station receives message 1 210, allocates radio resources together with the random access preamble and time synchronization information (a Timing Advancement Command) so that the UE may transmit message 3 230, and transmits message 2 220 including the aforementioned information to the UE (202).

The UE receives message 2 220 and transmits message 3 230 including a connection request to the base station by using the allocated resources (203). In this case, the UE also transmits a random number to the base station in order to represent its own identity. This is for enabling the base station to identify a plurality of UEs and make a connection with one specific UE because the multiple UEs may transmit message 3 230 to the base station when the multiple UEs select the same random access preamble.

The base station receives message 3 230 and transmits message 4 240 including the identity of the UE to the UE (204).

Figure 3:
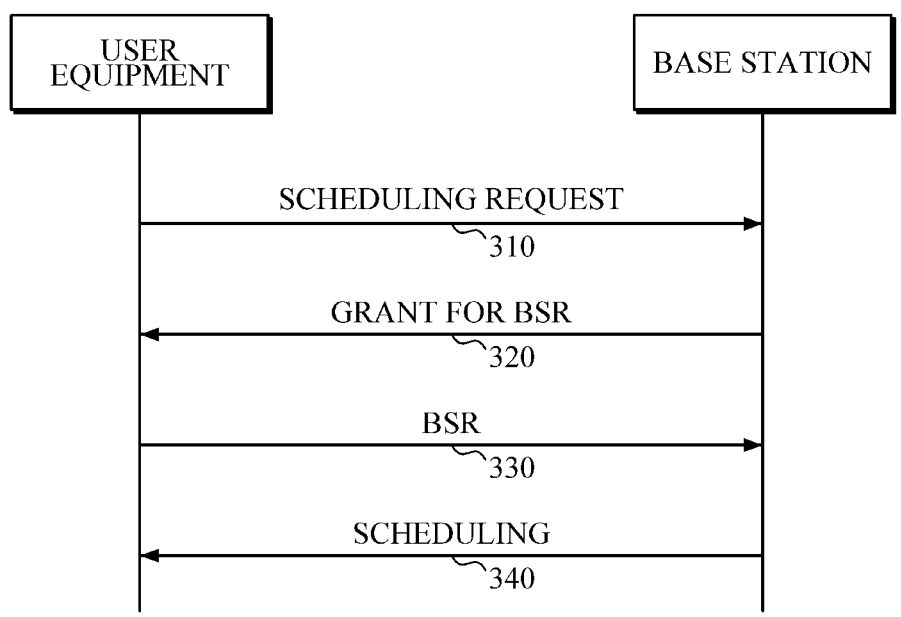
FIG. 3 is a flowchart showing a conventional procedure when uplink data is generated.

FIG. 3 is a flowchart showing a general processing flow when uplink data is generated. FIG. 3 shows a process performed when uplink data is generated when a UE has not performed uplink transmission for a while.

Referring to FIG. 3, a UE transmits a Scheduling Request (SR), which is one-bit information, to a base station on a Physical Uplink Control Channel (PUCCH) (310). When the base station receives the SR, the base station allocates Physical Uplink Shared Channel (PUSCH) resources, which are used to transmit a Buffer Status Report (BSR), to the UE (320). The UE transmits the BSR by using the allocated resources (330), and the base station allocates uplink resources to the UE on the basis of the received BSR. When this process is complete, the UE may transmit uplink data.

When the UE has no PUCCH resources to be used to transmit the SR, the UE sends a scheduling request to the base station in the random access method described with reference to FIG. 2. The UE transmits message 3 230 including the BSR and receives resource allocation through message 4 240.

Figure 4:
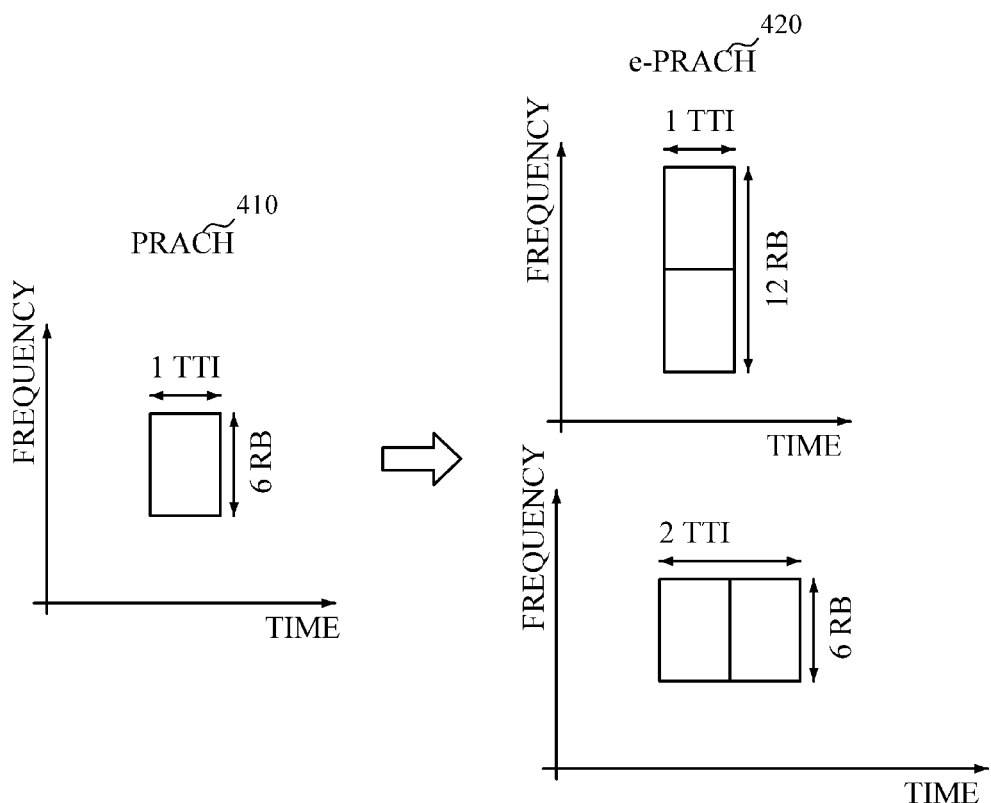
FIG. 4 is a diagram illustrating an e-PRACH.

FIG. 4 is a diagram illustrating an extended-Physical Random Access Channel (e-PRACH). Here, a left side of FIG. 4 shows a general PRACH 410, and a right side of FIG. 4 shows an e-PRACH 420.

The general PRACH 410 may be allocated onto time resources corresponding to one transmission time interval (TTI) in the time domain and frequency resources corresponding to six resource blocks (RBs) (here, each RB refers to a minimum unit of allocated radio resources in the frequency domain). The general PRACH 410 may carry one of 64 independent random access preambles that may be defined based on six-bit information. A plurality of UEs may access the channel based on different random access preambles on the same PRACH 410.

The e-PRACH 420 may define a larger number of random access preambles than the number of random access preambles defined based on the general PRACH 410. Here, since the term "e-PRACH" is merely defined in consideration of a channel function, another term may be used.

The e-PRACH 420 may carry random access preambles defined based on z bits (z is a natural number, e.g., 12 bits). More time resources (e.g., two times more time resources) may be allocated to the e-PRACH 420 than to the general PRACH 410. Alternatively, more frequency resources (e.g., two times more frequency resources) may be allocated to the e-PRACH 420 than to the general PRACH 410. The e-PRACH 420 may be allocated onto frequency resources corresponding to x RBs (here, x is a natural number) and/or time resources corresponding to y TTIs (here, y is a natural number) in a subframe. In this case, x and y may be variables that allocate more radio resources to the e-PRACH 420 than to the general PRACH 410. When larger than 12-bit information is carried on the basis of the e-PRACH 420 (or when a larger number of random access preambles are defined on the basis of the e-PRACH 420), an amount of time resources and frequency resources that are allocated to the e-PRACH 420 may be greater than an amount of time resources and frequency resources allocated to the general PRACH 410.

Figure 5:
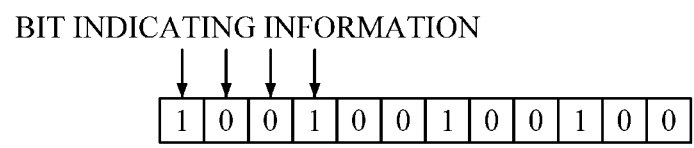
FIG. 5 is a conceptual diagram showing a random access preamble carried on an e-PRACH.
Figure 6:
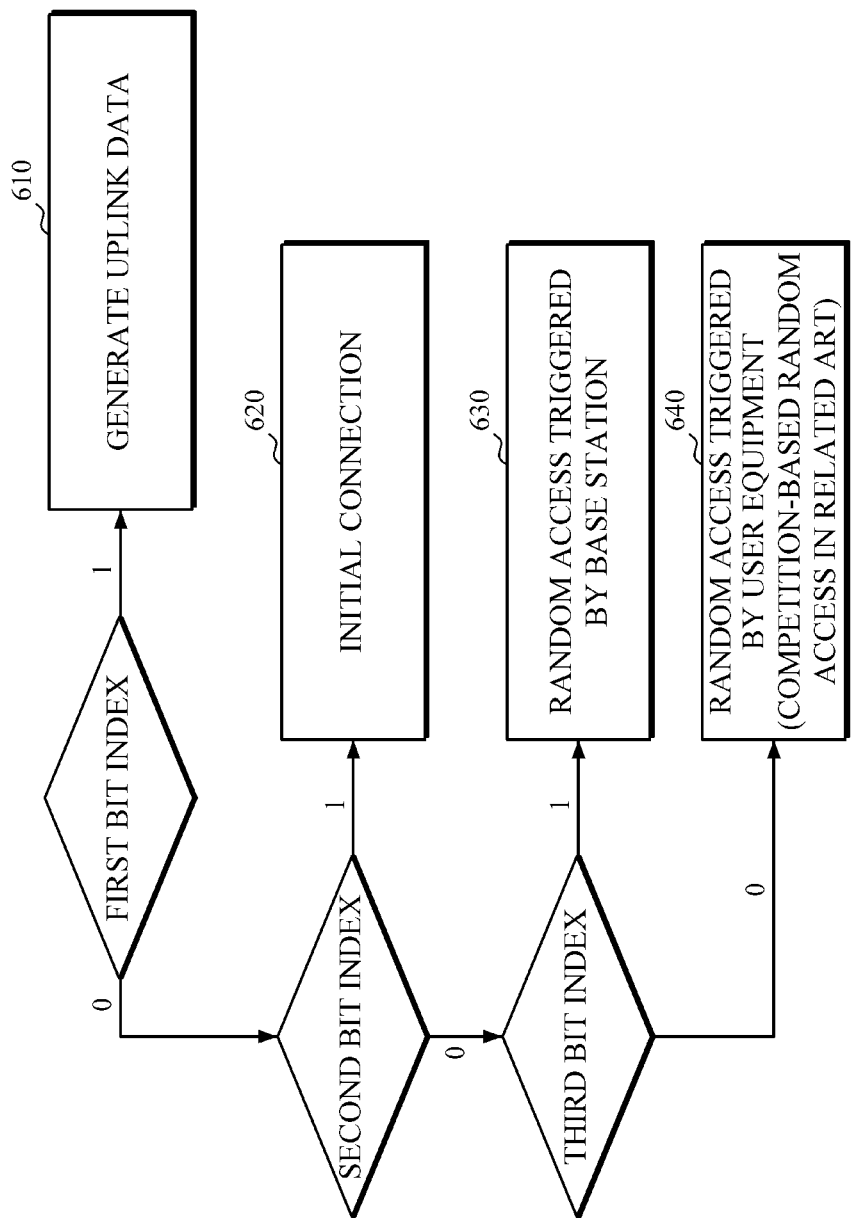
FIG. 6 is a flowchart showing an information transfer method based on a random access preamble carried on an e-PRACH.

FIG. 5 is a conceptual diagram showing a random access preamble carried on an e-PRACH, FIG. 6 is a flowchart showing an information transfer method based on a random access preamble carried on an e-PRACH, and FIG. 7 is an example diagram showing a buffer status information transfer method based on a random access preamble carried on an e-PRACH.

FIGS. 5 to 7 assume that a random access preamble is 12-bit information.

Referring to FIG. 5, a 12-bit random access preamble may implicitly carry random access purpose information and BSR information of a UE.

Figure 13:
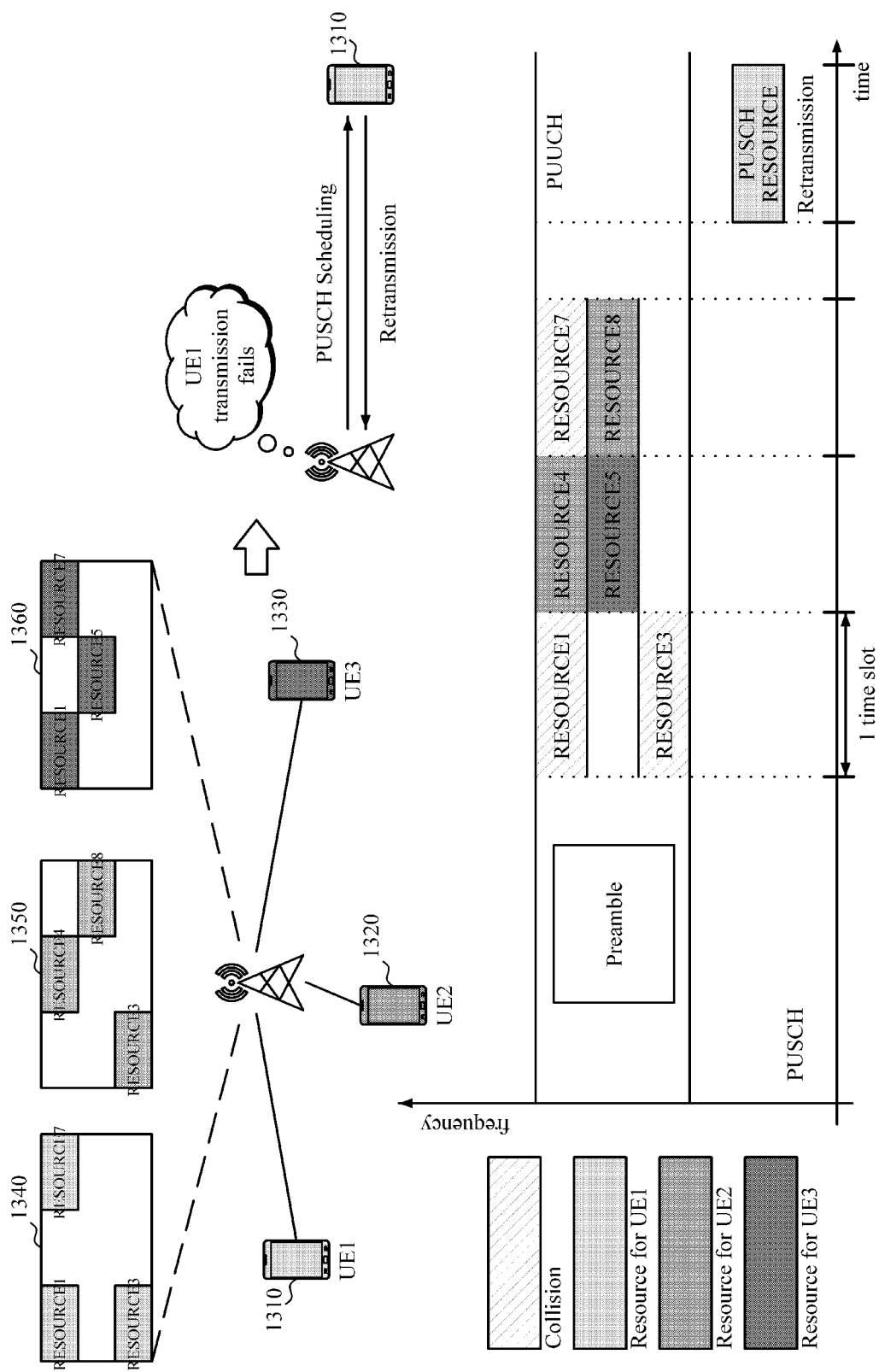
FIG. 13 is an example diagram illustrating the uplink data transmission method of FIG. 12.

Referring to FIG. 6, when a base station receives a random access preamble from a UE on an e-PRACH, the base station may determine the first three bits (a most significant bit (MSB or a first bit), MSB-1 (or a second bit), and MSB-2 (or a third bit)) among the 12-bit information of the random access preamble. When the MSB (or the first bit) of the random access preamble is "1," the base station may determine that a random access purpose of the UE is to transmit uplink data that is buffered in the UE (610). On the other hand, when the MSB (or the first bit) of the random access preamble is "0," the base station may acquire information regarding the random access of the UE on the basis the additional bits MSB-1 and MSB-2 of the random access preamble. According to an embodiment, when the first two bits of the random access preamble are "01," an initial connection of the UE may be implicitly indicated on the basis of the random access preamble (620). Also, when the first three bits of the random access preamble are "001," a random access triggered by the base station may be implicitly indicated on the basis of the random access preamble (630). When the first three bits of the random access preamble are "000," a contention-based random access except for the initial connection may be implicitly indicated on the basis of the random access preamble (640). The above-described information may be implicitly transferred on the basis of the maximum three bits among the 12-bit information of the random access preamble, and different random access preambles allocated to different UEs may be defined based on the remaining nine bits. 512 different random access preambles may be defined on the basis of nine bits. Each of the 512 random access preambles may be allocated to up to 512 UEs. The base station may recognize specific UE performing random access on the basis of a random access preamble carried on the e-PRACH from the UE. According to an embodiment, when uplink data is generated and thus a UE attempts random access, a base station may additionally check a predetermined number of bits as described above. When uplink data is generated, the MSB of the random access preamble may be "1," and BSR information of the UE may be transferred to the base station on the basis of additional bits (MSB-1, MSB-2, and MSB-3 (or a fourth bit)) of the random access preamble. Hereinafter, the additional bits of the random access preamble for transferring the BSR information of the UE are referred to as BSR information transfer bits. For example, the BSR information transfer bits are three bits, and the three bits may include information regarding the amount of uplink data buffered in the UE as shown in FIG. 13. When the MSB of the random access preamble is "1," the base station may confirm the BSR information transfer bits and may acquire information regarding the amount of uplink data to be transmitted by the UE.

The base station may allocate radio resources for uplink transmission to the UE on the basis of the BSR information transfer bits received from the UE. When the random access preamble carried on an e-PRACH is 12-bit information, 8 bits other than the MSB indicating the uplink data arrival and MSB-1, MSB-2, and MSB-3 corresponding to the BSR information transfer bits may be used to define different random access preambles. 256 different random access preambles may be defined on the basis of the 8 bits and may be allocated to up to 256 UEs. The base station may acquire information regarding the uplink data buffered in the UE on the basis of the BSR information transfer bits of the random access preamble received through the e-PRACH.

Figure 8:
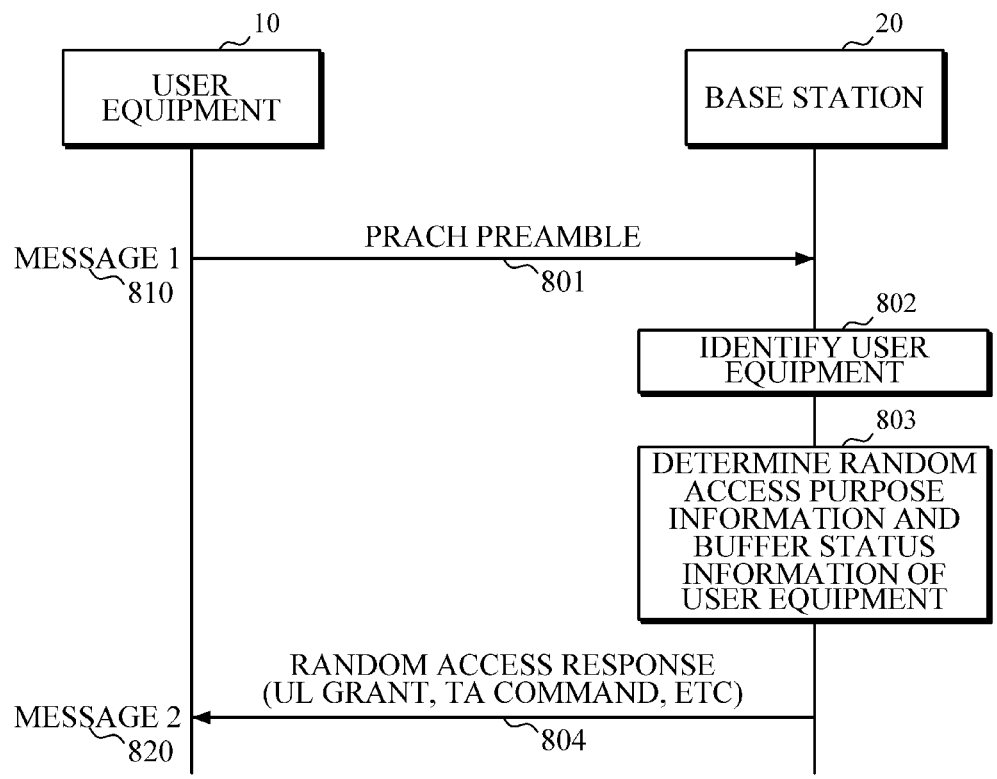
FIG. 8 is a flowchart showing an embodiment of a random access method for low latency communication.

FIG. 8 is a flowchart showing an embodiment of a random access method for low latency communication.

Referring to FIG. 8, the UE 10 transmits message 1 810 including a random access preamble uniquely allocated to the UE 10 on an e-PRACH (801).

In this case, as described above with reference to FIGS. 5 to 7, the random access preamble may include additional information regarding random access, that is, random access purpose information, buffer status information of the UE, etc.

The base station 20 receives message 1 810 including the random access preamble and identifies the UE 10 based on the random access preamble (802) and determines a random access purpose and a buffer status of the UE 10 (803).

The base station 20 allocates uplink transmission resources for uplink data transmission to the UE 10 on the basis of the buffer status of the UE 10 and transmits message 2 820 including resource allocation information to the UE 10 (804).

When random access of the UE is performed on the basis of the above-described method, there is no need for transmission processes 203 and 204 of message 3 and message 4 in the general random access method shown in FIG. 2. This is because when a base station receives a random access preamble on an e-PRACH, the base station may definitely be aware of a UE that transmits the random access preamble. Accordingly, the random access method according to an embodiment may be performed in the way described in FIG. 8. Except for an initial connection, random access is performed by only exchanging two messages (message 1 810 and message 2 820), and thus a time required for the random access of the UE can be drastically reduced. Also, even when uplink transmission is performed by requesting resources through a PUCCH, the method proposed in the present invention may be applied. This is possible because the information regarding the buffer status of the UE may be transferred through the random access preamble. Thus, a latency for an uplink transmission can be reduced.

This may be applied even when uplink data is generated when a UE has not performed uplink transmission for a while. When the uplink data is generated, the UE generally transmits a SR, which is one-bit of information, to a base station on a PUCCH. When the base station receives the SR, the base station allocates PUSCH resources, which are used to transmit a BSR, to the UE. The UE transmits the BSR by using the allocated resources. The base station allocates uplink resources to the UE on the basis of the BSR. The UE transmits uplink data by using the allocated uplink resources. However, since a general 4-way handshaking-based uplink transmission process is converted into a 2-way handshaking-based process when the above-described random access method according to an embodiment is used, a latency can be reduced.

According to the above-described random access method according to an embodiment, the UE may transmit a random access preamble that includes addition information and is distinct from those of other UEs to the base station so that random access may be successful without a third random access step 203 and a last random access step 204 of the random access procedure described above with reference to FIG. 2.

When random access except for an initial connection is performed, a random access procedure may be complete through exchange of two messages by a unique random access preamble being pre-allocated to a UE in an LTE system. Accordingly, a latency for random access can be reduced. Also, random access purpose information of the UE may be transferred through a random access preamble for the random access.

Also, competition between UE can be reduced during an initial connection and can be removed in advance in other random access situations by increasing the number of random access preamble that is a first random access message in consideration of all situations in which random access occurs.

According to an embodiment, a random access preamble set may be divided in advance for each purpose by increasing the number of bits of the random access preamble and including random access purpose information in the random access preamble. Thus, a UE may receive allocation of a random access preamble set distinct from those of other UEs. A latency for random access can be reduced by converting a random access process from a 4-way handshake of the existing LTE to a 2-way handshake.

Figure 9:
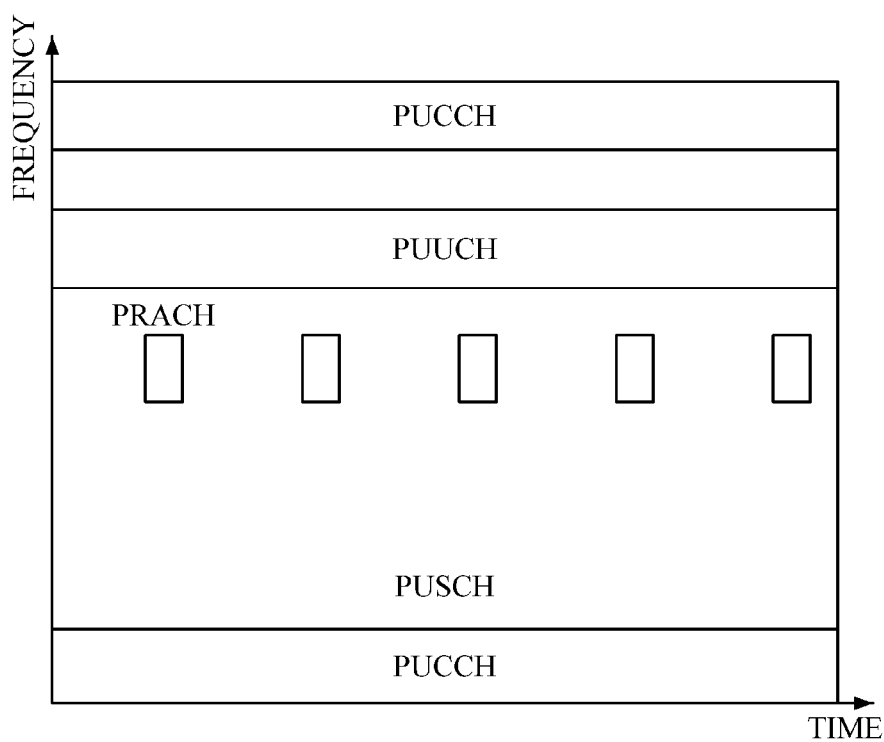
FIG. 9 is a diagram showing an example of an uplink channel.

FIG. 9 is a diagram showing an example of an uplink channel.

Referring to FIG. 9, an uplink channel may include a PRACH, a PUCCH, a PUSCH, and a Physical Uplink Urgent data Channel (PUUCH).

The PRACH may be used by a UE that has no resource allocated to request that a base station allocate resources for uplink data transmission or to connect to the base station and may carry information regarding a random access channel (RACH) used to transmit an initial control message.

The PUCCH may carry uplink control information such as a Hybrid Automatic Repeat reQuest (HARQ) Acknowledgement (ACK)/Non-Acknowledgement (NACK), a Channel Quality Indicator (CQI), etc.

The PUSCH may carry information regarding an uplink shared channel (UL-SCH) used to transmit user traffic or a control message other than an initial control message.

The PUUCH is a channel defined to transmit uplink data requiring low latency and may sequentially carry a random access preamble and uplink data requiring low latency. The term "PUUCH" is merely defined in consideration of a channel function, and thus another term may be used.

Figure 10:
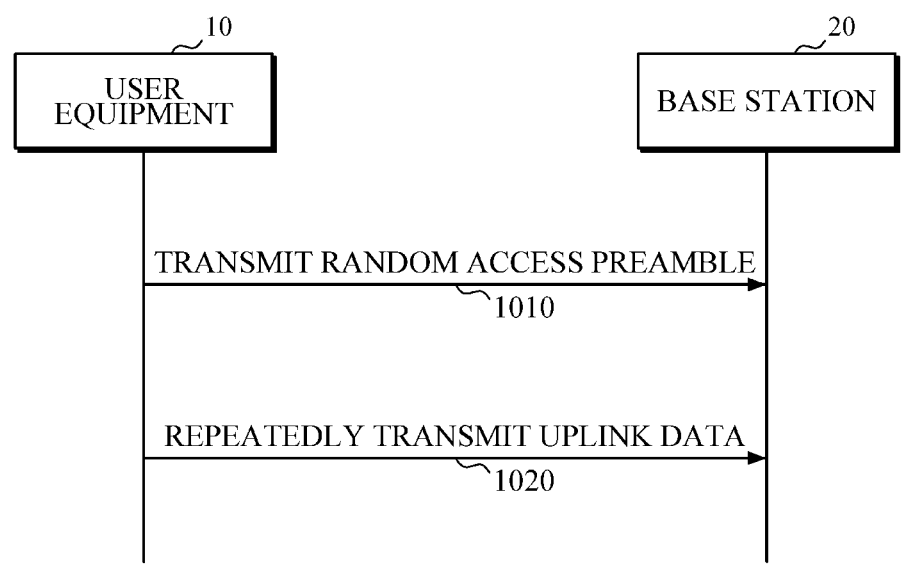
FIG. 10 is a flowchart showing an embodiment of an uplink data transmission method.

FIG. 10 is a flowchart showing an embodiment of an uplink data transmission method.

Referring to FIG. 10, the UE 10 may transmit a random access preamble allocated thereto to a base station 20 on a PUUCH (1010). In this case, the random access preamble is pre-allocated to the UE 10 by the base station 20 and may serve as an identifier for identifying the UE 10 from other UEs.

The PUUCH has been described above with reference to FIG. 9, and a detailed description thereof will be omitted.

The UE 10 may repeatedly transmit uplink data to the base station 20 by using a set of resources corresponding to the allocated random access preamble immediately after transmitting the allocated random access preamble to the base station 20 (1020).

In this case, a resource set may refer to a set of resources selected from a resource pool defined by time and frequency on the PUUCH. In this case, the total number of resources in the resource pool may be adjusted according to the number of time domain resources and the number of frequency domain resources. For example, assuming that the time domain resources include a total of three resources, i.e., a first time slot, a second time slot, and a third time slot, and the frequency domain resources include a total of three resources, i.e., a first frequency range, a second frequency range, and a third frequency range, the resource pool may include a total of nine (3*3=9) resources.

Also, the base station 20 may determine the number of time domain resources and/or the number of frequency domain resources on the basis of the number of UEs connected to the base station 20.

Accordingly, each resource set may correspond to a random access preamble allocated to each UE on a one-to-one basis. For example, a first resource set including resource 1, resource 3, and resource 5 may correspond to a first random access preamble, and a second resource set including resource 1, resource 2, and resource 4 may correspond to a second random access preamble.

Also, the number of resources included in each resource set may be equal to the number of time domain resources in the resource pool. However, this is merely an embodiment, and the present invention is not limited thereto. Accordingly, the number of resources included in each resource set may be different from the number of time domain resources in the resource pool depending on use and performance of a system. That is, the number of resources included in each resource set may be greater than or less than the number of time domain resources in the resource pool.

Information regarding a resource set corresponding to the random access preamble allocated to the UE 10 may be acquired on the basis of prestored information regarding relations between random access preambles and resource sets or may be allocated by the base station 20 together with the random access preamble. In this case, the information regarding relations between random access preambles and resource sets may refer to information regarding a plurality of random access preambles and resource sets corresponding to the random access preambles that are managed by the base station 20.

Thus, when the base station 20 receives a specific random access preamble, the base station 20 may identify a UE that transmitted the random access preamble in order to transmit uplink data and may be aware of a resource set allocated to the identified UE at the same time. Also, although some resources are shared with another UE and thus data transmission collision with the other UE occurs, a probability that data transmission will be successful may increase because the same data is repeatedly sent several times.

Figure 11:
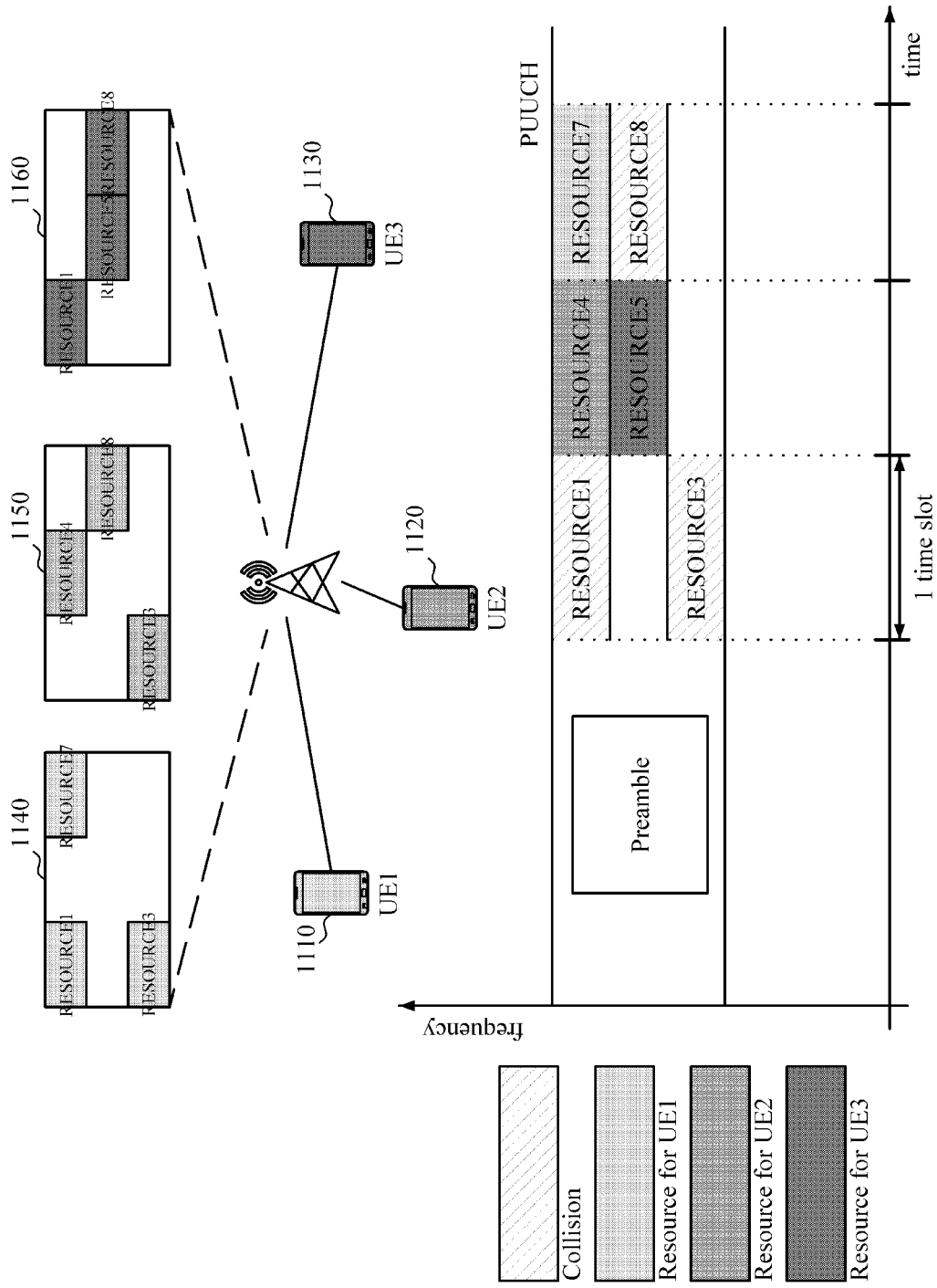
FIG. 11 is an example diagram illustrating the uplink data transmission method of FIG. 10.

FIG. 11 is an example diagram illustrating the uplink data transmission method of FIG. 10. FIG. 11 shows an example in which three UE intend to transmit uplink data on a PUUCH and assumes that a first resource set 1140, a second resource set 1150, and a third resource set 1160 are allocated to a first UE 1110, a second UE 1120, and a third UE 1130, respectively.

Referring to FIG. 11, the first UE 1110, the second UE 1120, and the third UE 1130 transmit prior allocated random access preamble to a base station on a PUUCH. Subsequently, in a first time slot, the first UE 1110 transmits uplink data by using resource 1 and resource 3, the second UE 1120 transmits uplink data by using resource 3, and the third UE 1130 transmits uplink data by using resource 1. Accordingly, in the first time slot, the data transmission of the first UE 1110 collides with the data transmission of the second UE 1120 and the third UE 1130.

Subsequently, in the second time slot, the second UE 1120 transmits uplink data by using resource 4, and the third UE 1130 transmits uplink data by using resource 5. Accordingly, the data transmission of the second UE 1120 and the third UE 1130 succeeds in the second time slot.

Subsequently, in the third time slot, the first UE 1110 transmits uplink data by using resource 7, and the second UE 1120 and the third UE 1130 transmit uplink data by using resource 8. Accordingly, at the third time slot, the data transmission of the first UE 1110 succeeds, but the data transmission of the second UE 1120 collides with the data transmission of the third UE 1130.

As a result, the first UE 1110 successfully transmits the uplink data through the third data transmission that uses resource 7, the second UE 1120 successfully transmits the uplink data through the second data transmission that uses resource 4, and the third UE 1130 successfully transmits the uplink data through the second data transmission that uses resource 5.

That is, according to the uplink data transmission method according to an embodiment, a latency for uplink data transmission requiring low latency can be reduced by transmitting uplink data immediately after transmitting a random access preamble. Also, a probability of transmission failure that may be caused by data transmission collision with another UE can be reduced by repeatedly transmitting uplink data.

Figure 12:
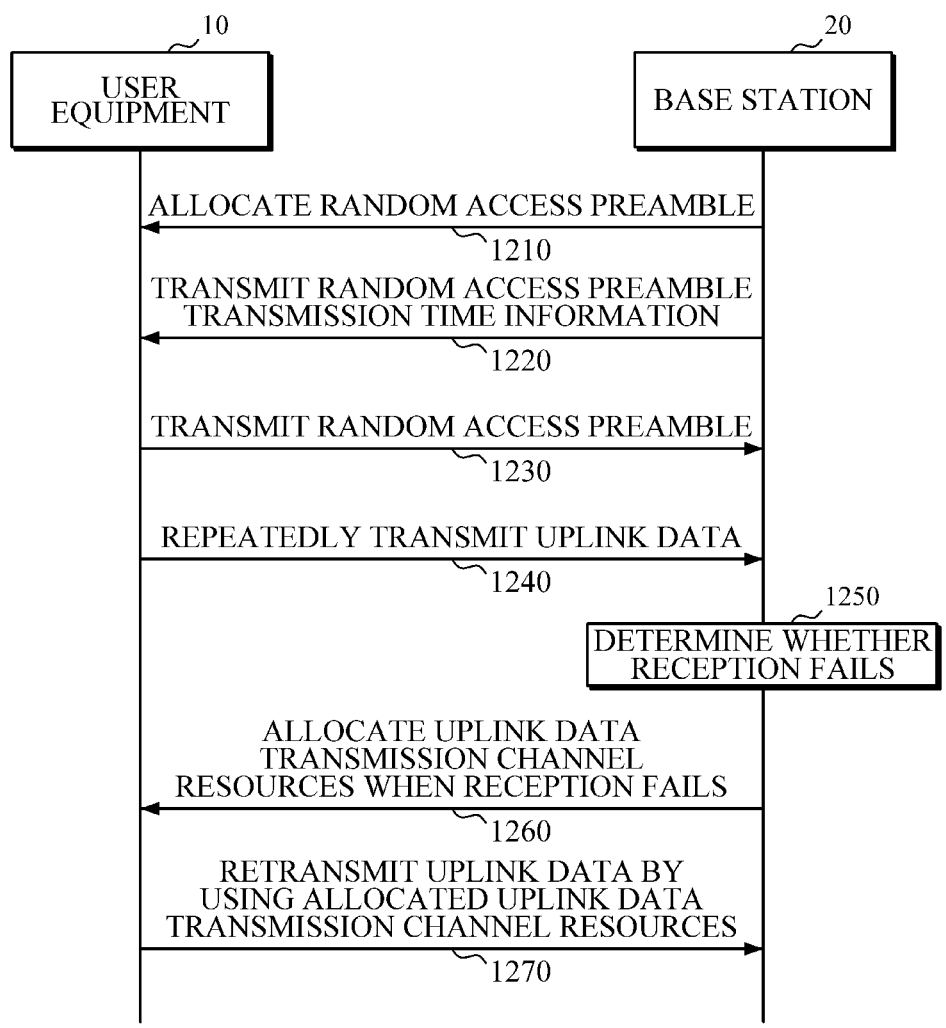
FIG. 12 is a flowchart showing another embodiment of an uplink data transmission method.

FIG. 12 is a flowchart showing another embodiment of an uplink data transmission method.

Referring to FIG. 12, the base station 20 may allocate a random access preamble for identifying the UE 10 to the UE 10 (1210).

The base station 20 may transmit random access preamble transmission time information together with system information (e.g., a system information block (SIB)) (1220).

The UE 10 may transmit the allocated random access preamble to the base station 20 on a PUUCH at a transmission time of the random access preamble (1230).

The UE 10 may repeatedly transmit uplink data to the base station 20 by using a set of resources corresponding to the allocated random access preamble immediately after transmitting the allocated random access preamble to the base station 20 (1240).

The base station 20 may determine whether reception of the uplink data transmitted by the UE 10 has failed (1250). Since the base station may be aware of resources that are used by each UE to transmit uplink data, the base station 20 may determine which UE has failed in transmission when the reception has failed. On the basis of the determination, the base station 20 may determine whether the UE 10 has failed in transmission.

When it is determined that reception of the uplink data transmitted by the UE 10 has failed, the base station 20 allocates uplink data transmission channel resources (e.g., PUUCH resources) for retransmission to the UE 10 (1260).

The UE 10 may retransmit the uplink data by using the allocated uplink data transmission channel resources (1270).

FIG. 13 is an example diagram illustrating the uplink data transmission method of FIG. 12. FIG. 13 shows an example in which three UEs intend to transmit uplink data on a PUUCH and assumes that a first resource set 1340, a second resource set 1350, and a third resource set 1360 are allocated to a first UE 1310, a second UE 1320, and a third UE 1330, respectively.

Referring to FIG. 13, first, the first UE 1310, the second UE 1320, and the third UE 1330 transmit allocated random access preambles respectively to a base station on a PUUCH at a transmission time of the random access preamble. In this case, a transmission time of the random access preamble may be found from random access preamble transmission time information that is received together with system information (e.g., a SIB).

Subsequently, in a first time slot, the first UE 1310 transmits uplink data by using resource 1 and resource 3, the second UE 1320 transmits uplink data by using resource 3, and the third UE 1330 transmits uplink data by using resource 1. Accordingly, in the first time slot, the data transmission of the first UE 1310 collides with data transmission of the second UE 1320 and the third UE 1330.

Subsequently, in a second time slot, the second UE 1320 transmits uplink data by using resource 4, and the third UE 1330 transmits uplink data by using resource 5. Accordingly, the data transmission of the second UE 1320 and the third UE 1330 succeeds in the second time slot.

Subsequently, in a third time slot, the first UE 1310 and the third UE 1330 transmit uplink data by using resource 7, and the second UE 1320 transmits uplink data by using resource 9. Accordingly, in the third time slot, the data transmission of the second UE 1320 succeeds, but the data transmission of the first UE 1310 collides with the data transmission of the third UE 1330.

As a result, the second UE 1320 successfully transmits the uplink data through the second data transmission that uses resource 4 and the third data transmission that uses resource 7, and the third UE 1330 successfully transmits the uplink data through the second data transmission that uses resource 5. However, the three data transmissions of the first UE 1310 using resource 1, resource 3, and resource 7 all fail.

In this case, the base station recognizes that the first UE 1310 has failed in transmission and quickly allocates uplink data transmission channel resources (e.g., PUSCH resources) for retransmitting the uplink data that failed to be transmitted to the first UE 1310. The first UE 1310 retransmits the uplink data that failed to be transmitted to the base station by using the uplink data transmission channel resources allocated by the base station.

Figure 14:
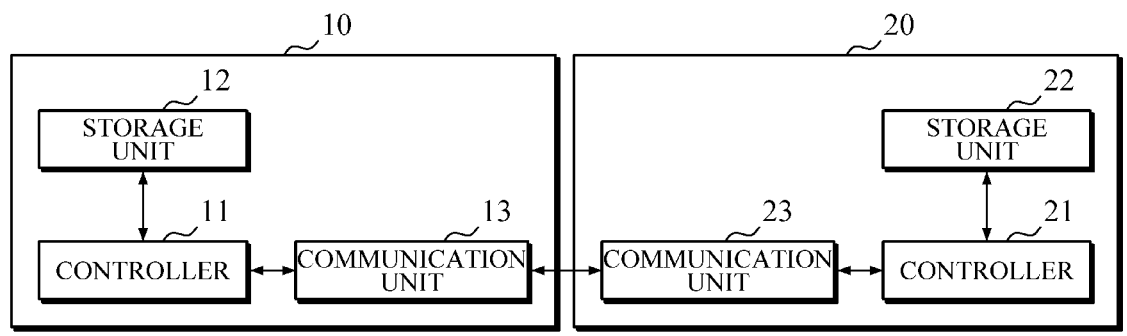
FIG. 14 is a detailed block diagram of a mobile communication system.

FIG. 14 is a detailed block diagram of a mobile communication system.

The UE 10 may include a controller 11, a storage unit 12, and a communication unit 13. The storage unit 12 may store a variety of information for operation of the controller 11 under control of the controller 11. The communication unit 13 may transmit data to the base station 20 or receive data from the base station 20 under control of the controller 11. The controller 11 may implement the functions, processes, and/or methods that have been proposed. That is, in the above embodiments, operations of the UE 10 may be implemented by the controller 11.

The base station 20 may include a controller 21, a storage unit 22, and a communication unit 23. The storage unit 22 may store a variety of information for operation of the controller 21 under control of the controller 21. The communication unit 13 may transmit data to the UE 10 or receive data from the UE 10 under control of the controller 21. The controller 21 may implement the functions, processes, and/or methods that have been proposed. That is, in the above embodiments, operations of the base station 20 may be implemented by the controller 21.

The controllers 11 and 21 may include an Application Specific Integrated Circuit (ASIC), another chipset, a logical circuit, and/or a data processing device. The storage units 12 and 22 may include a Read-Only Memory (ROM), a random access memory (RAM), a flash memory, a memory card, a storage medium, and/or other storage devices.

An aspect of the present invention may be embodied as computer-readable codes on a computer-readable recording medium. Codes and code segments constituting a computer program can be easily inferred by a skilled computer programmer in the art. The computer-readable recording medium may include any kinds of recording devices for storing data which can be thereafter read by a computer system. Examples of the computer-readable recording medium include a ROM, a RAM, a compact disc (CD)-ROM, a magnetic tape, a floppy disk, an optical disk, etc. The computer-readable recording medium can also be distributed over network-coupled computer systems so that the computer-readable codes are stored and executed in a distributed fashion.

The present invention has been described with reference to example embodiments. Those skilled in the art should understand that various changes in form and details may be made therein without departing from the spirit and scope of the present invention. Therefore, the scope of the present invention should be construed not as being limited by the above-described embodiments but as including various embodiments within a range equivalent to the appended claims.

What is claimed is:

1. A random access method, comprising:
receiving, from a User Equipment (UE), a set of random access preambles that is uniquely allocated to the UE, on an extended-Physical Random Access Channel (e-PRACH); and
identifying the UE based on the set of random access preambles that is uniquely allocated to the UE,
wherein the e-PRACH is allocated a predetermined multiple of frequency resources or time resources that is greater than a Physical Random Access Channel,
wherein the set of random access preambles contains an identifier of the UE and additional information of the UE,
wherein a base station determines the identity of the UE from a predetermined number of bits of the random access preambles received from the UE,
wherein when a random access purpose of the UE is determined from the set of random access preambles to be an operation to transmit uplink data, the base station allocates, based on the identification of the UE received in the set of random access preambles, and in response to the receipt of the set of random access preambles from the UE, uplink transmission resources for uplink data transmission to the UE based on a buffer status of the UE determined from the received set of random access preambles, and
wherein the allocating of the uplink transmission resources for uplink data transmission to the UE in response to the receipt of the set of random access preambles from the UE reduces a latency in the e-PRACH when compared to a latency of the Physical Random Access Channel.

2. The random access method of claim 1, wherein the e-PRACH is allocated onto frequency resources corresponding to x resource blocks (RBs) (here, x is a natural number) and time resources corresponding to y transmission time intervals (TTIs) (here, y is a natural number).

3. The random access method of claim 2, further comprising acquiring the additional information that is regarding random access from the random access preamble.

4. The random access method of claim 3, wherein the additional information includes either one or both of random access purpose information and buffer status information of the UE.

5. The random access method of claim 4, further comprising allocating the uplink transmission resources for transmission of uplink data to the UE based on the buffer status information, wherein the additional information includes the buffer status information.

6. The random access method of claim 1, wherein the allocating of the uplink transmission resources to the UE on the e-PRACH is distinguished from a connection request from the UE to the base station in the Physical Random Access Channel, and a connection setup message from the base station to the UE in the Physical Random Access Channel.

7. The random access method of claim 1, wherein the receiving of the set of random access preambles, and the allocating of the uplink transmission resources for uplink data transmission to the UE in response to the receipt of the set of random access preambles from the UE, is a 2-way handshake type random access method that implements the e-PRACH.

* * * * *